US012555724B2

(12) United States Patent
Nieh et al.

(10) Patent No.: US 12,555,724 B2
(45) Date of Patent: Feb. 17, 2026

(54) SWITCHING DEVICE

(71) Applicant: DEFOND ELECTECH CO., LTD, Guangdong (CN)

(72) Inventors: Cheng Chen Nieh, Dongguan (CN); Chiu Keung Loong, Dongguan (CN); Wai Man Wong, Dongguan (CN)

(73) Assignee: DEFOND ELECTECH CO., LTD., Guangdong (CN)

( * ) Notice: Subject to any disclaimer, the term of this patent is extended or adjusted under 35 U.S.C. 154(b) by 658 days.

(21) Appl. No.: 17/712,421

(22) Filed: Apr. 4, 2022

(65) Prior Publication Data

US 2023/0245840 A1  Aug. 3, 2023

(30) Foreign Application Priority Data

Jan. 5, 2022  (CN) .......................... 202210005783.7

(51) Int. Cl.
*H01H 9/40* (2006.01)
*B25F 5/00* (2006.01)

(52) U.S. Cl.
CPC .................. *H01H 9/40* (2013.01); *B25F 5/00* (2013.01)

(58) Field of Classification Search
CPC .. H01H 9/40; H01H 1/5866; H01H 2231/048; H01H 1/5833; H01H 1/5822;

(Continued)

(56) References Cited

U.S. PATENT DOCUMENTS 4,733,033 A * 3/1988 Morris ..................... H01H 1/22
200/267
4,931,603 A * 6/1990 Castonguay ......... H01H 1/5833
218/155

(Continued)

FOREIGN PATENT DOCUMENTS

EP           1060489 A1    12/2000
WO      WO-00/39824 A1     7/2000

OTHER PUBLICATIONS

Communication Under Rule 71(3) EPC for European Application No. 22163539.4, dated Mar. 15, 2024.

(Continued)

*Primary Examiner* — Lheiren Mae A Caroc
(74) *Attorney, Agent, or Firm* — MARSHALL, GERSTEIN & BORUN LLP

(57) ABSTRACT

The present disclosure provides a switching device, which includes an electricity leading member, a power transmission member, and a conductive connecting member. The first end of the electricity leading member is configured to be electrically connected with the power supply terminal, and the second end of the electricity leading member is provided with a first contact portion; the power transmission member is provided with a second contact portion, and the second contact portion is configured to contact and be electrically connected with the first contact portion; one end of the conductive connecting member is connected with the electricity leading member, the other end is connected with the power transmission member, the electricity leading member is electrically connected with the power transmission member through the conductive connecting member.

7 Claims, 8 Drawing Sheets

(58) Field of Classification Search
CPC .. H01H 9/30; H01H 1/00; H01H 1/06; H01H 1/12; H01H 2001/0005; B25F 5/00
See application file for complete search history.

(56) References Cited

U.S. PATENT DOCUMENTS

| | | | |
|---|---|---|---|
| 4,999,464 A * | 3/1991 | Bellino | H01H 1/023 200/275 |
| 5,286,934 A | 2/1994 | Bellino et al. | |
| 6,717,080 B1 | 4/2004 | Chan et al. | |

OTHER PUBLICATIONS

Communication pursuant to Article 94 (3) EPC for European Application No. 22163539.4, dated Sep. 28, 2022.
European Search Report for European Application No. 22163539.4, dated Sep. 16, 2022.

* cited by examiner

SWITCHING DEVICE

CROSS-REFERENCE TO RELATED APPLICATION

The present disclosure claims priority of Chinese patent application with the filing number 202210005783.7 filed on Jan. 5, 2022 with the Chinese Patent Office, and entitled "Switching Device", the contents of which are incorporated herein by reference in entirety.

TECHNICAL FIELD

The present disclosure relates to the technical field of electrical switch, in particular to a switching device.

BACKGROUND ART

A power tool switch, used to electrically connect a power supply terminal with an electric equipment, so that the current from the power supply terminal flows to the electric equipment for power supply, wherein the power tool switch realizes conduction of current of the closed circuit by two unit components contacting with each other; however, the traditional power tool switch, due to the vibration generated by the operation or the external environment, is easy to cause the disconnection of the contact connection, which is easy to generate electric arcs that can cause damage to electric appliances and circuits and be unsafe.

SUMMARY

The purpose of the embodiments of the present disclosure is to provide a switching device, which is used to solve the problem that conventional power tool switch generates electric arcs, due to the impact of vibration causing disconnection of the contact connection.

The embodiments of the present disclosure provide a switching device, comprising:
  an electricity leading member, wherein the first end of the electricity leading member is configured to be electrically connected with the power supply terminal, and the second end of the electricity leading member is provided with a first contact portion;
  a power transmission member, provided with a second contact portion, wherein the second contact portion is configured to contact and be electrically connected with the first contact portion; and
  a conductive connecting member, wherein one end of the conductive connecting member is connected with the electricity leading member, the other end is connected with the power transmission member, the electricity leading member is electrically connected with the power transmission member through the conductive connecting member.

In the above-mentioned switching device, the electricity leading member is configured to be electrically connected with the power supply terminal through the first end, and the power transmission member is configured to be electrically connected with an electric equipment; when the first contact portion of the electricity leading member is in contact with the second contact portion of the power transmission member, the first contact portion and the second contact portion are electrically connected with each other, thus forming a channel for the current to pass through the power supply terminal, the electricity leading member, the first contact portion, the second contact portion, the power transmission member and the electric equipment in sequence, so that the electric equipment can be powered. Simultaneously, the electricity leading member is connected with the power transmission member through the conductive connecting member, and the conductive connecting member may be conductive, so the conductive connecting member may electrically connect the electricity leading member and the power transmission member, thereby forming another channel for the current to pass through the power supply terminal, the electricity leading member, conductive connecting member, the power transmission member and the electric equipment in sequence; therefore, when the switching device is impacted by vibration so that the contact between the first contact portion and the second contact portion is disengaged, the channel formed by the power supply terminal, the electricity leading member, the first contact portion, the second contact portion, the power transmission member and the electric equipment is disconnected between the first contact portion and the second contact portion, at this moment, since the conductive connecting member is still electrically connected with the electricity leading member and the power transmission member, the channel formed by the power supply terminal, the electricity leading member, the conductive connecting member, the power transmission member and the electric equipment is not disconnected, which can ensure that the current flows from the power supply terminal to the electric equipment normally, avoiding generation of electric arc at the position where the first contact portion and the second contact portion are disconnected, protecting electric appliances and circuits, and eliminating unsafe factors.

In one of the embodiments, the conductive connecting member is a flexible conductive member with variable distance between its two ends, that is, the length of the flexible conductive member may be extended or shortened, when the first contact portion and the second contact portion are out of contact, that is, the distance between the electricity leading member and the power transmission member is increased, the flexible conductive member may be stretched to keep the flexible conductive member still connected to the electricity leading member and the power transmission member; when the vibration is eliminated and the first contact portion and the second contact portion are in contact again, the flexible conductive member may be shortened or still remain elongated, as long as it is still connected to the electricity leading member and the power transmission member.

In one of the embodiments, one end of the flexible conductive member is connected to the first position point of the electricity leading member, and the other end of the flexible conductive member is connected to the second position point of the power transmission member, the distance between the first position point and the second position point is smaller than the length of the flexible conductive member. In this way, when the flexible conductive member is a soft wire, when the first contact portion and the second contact portion are in contact, the flexible conductive member is bent, and when the first contact portion and the second contact portion are out of contact, that is, the distance between the electricity leading member and the power transmission member is increased, the bending of the flexible conductive member as a wire is reduced, and the flexible conductive member is stretched a little, since the flexible conductive member is bent when the first contact portion and the second contact portion are in contact, when the first contact portion and the second contact portion are out of contact, the flexible conductive member can still connect the electricity leading member and the power transmission member; when the flexible conductive member is an elastic conductive member that can be stretched along its own length direction, and when the first contact portion and the second contact portion are in contact, the flexible conductive member may be in a compressed state, a natural-length state or a stretched state, when the first contact portion and the second contact portion are out of contact, that is, the distance between the electricity leading member and the power transmission member increases, the flexible conductive member will be stretched, and may still be connected to the electricity leading member and the power transmission member; it should be noted that, the length of the flexible conductive member as the elastic conductive member is still greater than the distance between the first contact point and the second contact point.

In one of the embodiments, the first position point is located at the second end of the electricity leading member, and located on the side of the first contact portion, and the second position point is located on the side of the second contact portion. In this embodiment, the flexible conductive member may be a wire, in this way, the distance between the first position point and the second position point is smaller, so that the required length of the flexible conductive member is also smaller, which can save a certain flexible conductive member material, and avoid entanglement or interference of the overlong flexible conductive member with other equipment.

In one of the embodiments, the conductive connecting member comprises a connecting body and a plurality of clamping bodies, wherein the connecting body is connected to the electricity leading member, and one end of each of the clamping bodies is connected with the connecting body, and the plurality of clamping bodies form a clamping space for clamping the power transmission member. In this embodiment, through the abutment between each of clamping bodies and the power transmission member, the power transmission member is electrically connected with the clamping bodies and the connecting body, and further electrically connected with the electricity leading member, and the power transmission member is clamped in the clamping space. Since the power transmission member abuts against each of clamping bodies and is located in the clamping space, when the first contact portion and the second contact portion are out of contact due to vibration, there is relative sliding between the power transmission member and each of clamping bodies, however, since the clamping space formed by clamping bodies has a certain depth, the power transmission member still abuts against each of clamping bodies, so that the clamping bodies are still electrically connected with the power transmission member, that is, the conductive connecting member is still electrically connected with the power transmission member, so as to ensure that the channel formed by the power supply terminal, the electricity leading member, the conductive connecting member, the power transmission member and the electric equipment is not disconnected due to the influence of vibration.

In one of the embodiments, each of the clamping bodies is an elastic member; each of the clamping bodies has an inner side surface for abutting the power transmission member, the inner side surface of each of the clamping bodies is bent inward, so that the inner side surface forms a convex curved surface; the opening formed by ends of the clamping bodies adjacent to the connecting body is larger than the opening formed by the middle points of the clamping bodies, the opening formed by ends of the clamping bodies away from the connecting body is larger than the opening formed by the middle points of the two clamping bodies, in this way, the entire clamping space is wide at both ends and narrow in the middle, so that the power transmission member can enter the clamping space along the wider opening, and can slide along the convex curved surface to reach the highest point of the convex curved surface, which can ensure that the elastic clamping bodies press the power transmission member tightly; moreover, since the width of the deep part of the clamping space is also larger than the width in the middle, when part or all of the power transmission member is located in the deep part of the clamping space, when the first contact portion and the second contact portion are disengaged due to vibration, the power transmission member may have the action of squeezing the clamping bodies, under the extrusion of the highest point of the convex curved surface, the power transmission member can be prevented from being separated from the clamping space, thereby ensuring that the conductive connecting member is electrically connected with the power transmission member.

In one of the embodiments, a portion between two ends of the connecting body is connected to the electricity leading member, and the conductive connecting member comprises two clamping bodies provided opposite to each other, one of the clamping bodies is provided at one end of the connecting body, and the other clamping body is provided at the other end of the connecting body, and the two clamping bodies are configured to clamp the power transmission member, in this way, by providing the clamping bodies at the end of the connecting body, the overall size of the conductive connecting member is reduced on the basis of ensuring that the power transmission member can be clamped, which not only saves materials, but also makes the structure compact, and prevents the conductive connecting member from interfering with other components; moreover, the two opposite surfaces of the power transmission member can be clamped by the two clamping bodies, to clamp the power transmission member tightly, so that the structure of the conductive connecting member is simple, the manufacturing is easy, and the material is further saved.

In one of the embodiments, a plurality of power transmission members are provided, a plurality of first contact portions are provided correspondingly, a plurality of first contact portions are electrically connected with a plurality of second contact portions in a manner of contacting in one-to-one correspondence; each of the at least one power transmission member is connected to the electricity leading member through one conductive connecting member, in this way, the plurality of second contact portions of the plurality of power transmission members are electrically connected with the plurality of first contact portions of the electricity leading member in a manner of contacting in one-to-one correspondence, when there is vibration, it is possible that some of the first contact portions and the second contact portions are not out of contact, which improves the possibility that the electricity leading member and the power transmission member are still electrically connected, thus improving the possibility of avoiding electric arcs caused by an open circuit; in this way, even when the conductive connecting member fails, that is, when the conductive connecting member fails to electrically connect the electricity leading member and the power transmission member, if the first contact portion and the second contact portion are still in contact, the channel from the power supply terminal to the electric equipment can still be ensured.

In one of the embodiments, one of the power transmission members is connected to the electricity leading member through one conductive connecting member, in this way, there is no need for multiple conductive connecting members to electrically connect the electricity leading member and the power transmission member, and just one conductive connecting member can realize the channel from the power supply terminal to the electric equipment, even if all the first contact portions are disengaged from the second contact portions, just one conductive connecting member can ensure the channel, which saves materials and costs.

In one of the embodiments, the end surface of the second end of the electricity leading member is provided with a plurality of grip portions, and the plurality of the grip portions form a grip space for clamping the power transmission member, the first contact portion is provided on the end surface of the second end of the electricity leading member and located in the grip space; the second contact portion is provided on surface of the power transmission member facing the second end of the electricity leading member; when the first contact portion is in contact with the second contact portion, each of the grip portions clamps the power transmission member, In this embodiment, each of the grip portions has conductivity, in this way, the power transmission member is gripped by each of the grip portions, so that the power transmission member can be stably confined in the grip space, and the second contact portion stably abuts the first contact portion, due to the restriction of each of the grip portions on the power transmission member, the second contact portion can be prevented from being separated from the first contact portion to a certain extent when subjected to vibration, and even when the first contact portion is separated from the second contact portion, the electrical connecting between the power transmission member and the grip portion can still ensure the formation of a channel of the power supply terminal, the electricity leading member, the grip portion, the power transmission member and the electric equipment; in this way, when the conductive connecting member fails, the channel can still be ensured to be formed.

In one of the embodiments, the grip space comprises two grip wall surfaces, each of the grip wall surfaces is provided with a plurality of mutually spaced limiting grooves, the plurality of the limiting grooves on one grip wall surface are one-to-one opposite to the plurality of the limiting grooves on the other grip wall surface, and the two opposite limiting grooves are configured to clamp and limit the power transmission member, in this embodiment, the limiting grooves are configured to accommodate and limit two opposite sides of the power transmission member, in this way, a plurality of spaced limiting grooves are formed, the limiting grooves can better limit the power transmission member and avoid the separation of the first contact portion and the second contact portion when subjected to vibration, and when the first contact portion and the second contact portion are separated due to vibration, that is, at the same time, when the power transmission member is away from the second end of the electricity leading member, the power transmission member slides from the first limiting groove to the second limiting groove, so that the power transmission member is still gripped and limited.

In one of the embodiments, the limiting groove has a limiting bottom surface and two limiting side surfaces respectively connected to both ends of the limiting bottom surface, one end of the limiting side surface away from the limiting bottom surface is connected to the grip wall surface, and one end of the limiting side surface away from the limiting bottom surface is inclined toward the grip wall surface, in this way, it is convenient to make the power transmission member enter the grip space and the limiting groove, which can not only limit the power transmission member to a certain extent during vibration, but also facilitate the power transmission member entering the grip space and the limiting groove during assembly, and the grip space can be set at a smaller size, so that the power transmission member can be more stably limited during limiting.

In one of the embodiments, the switching device further comprises a buffering telescopic member, one end of the buffering telescopic member is connected to the electricity leading member, and the other end is connected to the power transmission member, and the buffering telescopic member provides an acting force for keeping the first contact portion and the second contact portion in abutment, that is, the buffering telescopic member provides the force for the contact between the first contact portion of the electricity leading member and the second contact portion of the power transmission member, the first contact portion and the second contact portion are kept in abutment by providing the buffering telescopic member, the first contact portion and the second contact portion are prevented to a certain extent from being separated when the switching device is vibrated, which plays the role of double security in cooperation with the conductive connecting member; when the vibration is smaller, the first contact portion can still be in contact with the second contact portion under the action of the buffering telescopic member; when the vibration is larger so that the first contact portion and the second contact portion are disengaged against the force of the buffering telescopic member, the conductive connecting member still plays the role of electrically connecting the electricity leading member and the power transmission member; similarly, when the electrical connection of the conductive connecting member to the electricity leading member and the power transmission member fails, and the vibration is smaller, the buffering telescopic member can keep the first contact portion and the second contact portion in contact.

In one of the embodiments, the buffering telescopic member is provided between a first acting surface of the electricity leading member and a second acting surface of the power transmission member; the buffering telescopic member is a tensile elastic member; the first acting surface faces the power transmission member, the second acting surface faces the electricity leading member, and one end of the buffering telescopic member is connected with the first acting surface in a stretched manner, and the other end is connected with the second acting surface in a stretched manner, that is, one end of the buffering telescopic member is connected by stretching with the first acting surface, and the other end is s connected by stretching with the second acting surface, and the first acting surface and the second acting surface are respectively pulled by the tensile elastic member, so as to pull the electricity leading member and the power transmission member, so that the first contact portion and the second contact portion abut against each other, so as to realize the contact-type electrical connection; compared with the compressive elastic member, the tensile elastic member can maintain a straight shape without bending or shifting when being stretched, and can connect by stretching the electricity leading member and the power transmission member stably.

In one of the embodiments, the buffering telescopic member is provided between the first acting surface of the electricity leading member and the second acting surface of the power transmission member; the buffering telescopic member is a compressive elastic member; the first acting surface is facing away from the power transmission member, the second acting surface is facing away from the electricity leading member, and one end of the buffering telescopic member is connected with the first acting surface in a compressed manner, and the other end is connected with the second acting surface in a compressed manner, that is, one end of the buffering telescopic member is in compressing connection with the first acting surface, and the other end is in compressing connection with the second acting surface, for example, it can be abutment and extrusion, or it can be fixed connection and extrusion, the compressive elastic member compresses the first acting surface and the second acting surface, respectively, since the first acting surface is facing away from the power transmission member, and the second acting surface is facing away from the electricity leading member, it is possible to squeeze the electricity leading member towards the power transmission member and simultaneously squeeze the power transmission member towards the electricity leading member, so that the first contact portion and the second contact portion are abutted with each other, thereby realizing contact-type electrical connection.

In one of the embodiments, the first contact portion has a first contact surface, the second contact portion has a second contact surface, the first contact surface is configured to abut the second contact surface, so that the first contact portion is electrically connected with the second contact portion; the first contact surface and the second contact surface are respectively smooth surfaces, when the switching device is vibrated, the first contact portion and the second contact portion may occur wear during the continuous contact and disengagement process, the first contact surface of the first contact portion and the second contact surface of the second contact portion are provided as smooth surfaces, respectively, thereby avoiding or reducing the occurrence of wear when the first contact portion and the second contact portion touch back and forth.

In one of the embodiments, the first contact surface and the second contact surface are respectively provided with a smooth conductive coating or a conductive film, which can avoid or reduce the occurrence of wear of the first contact portion and the second contact portion during the continuous contact and disengagement process. Exemplarily, the conductive coating may be a graphite conductive powder layer.

Other features and advantages of the present disclosure will be explained in the succeeding specification, or some features and advantages may be inferred or unambiguously determined from the specification, or may be known by implementing the above-mentioned technology of the present disclosure.

In order to make the above-mentioned objects, features and advantages of the present disclosure more obvious and easier to understand, the preferred embodiments are exemplified below, and are described in detail as follows in conjunction with the accompanying drawings.

BRIEF DESCRIPTION OF DRAWINGS

In order to illustrate the technical solutions of the embodiments of the present disclosure more clearly, the drawings need to be used in the embodiments of present disclosure will be briefly introduced below, it should be understood that the following drawings only show some embodiments of the present disclosure, and therefore should not be regarded as a limitation of the scope, and for those ordinarily skilled in the art, other relevant drawings can also be obtained in light of these drawings, without using any inventive efforts.

Figure 1:
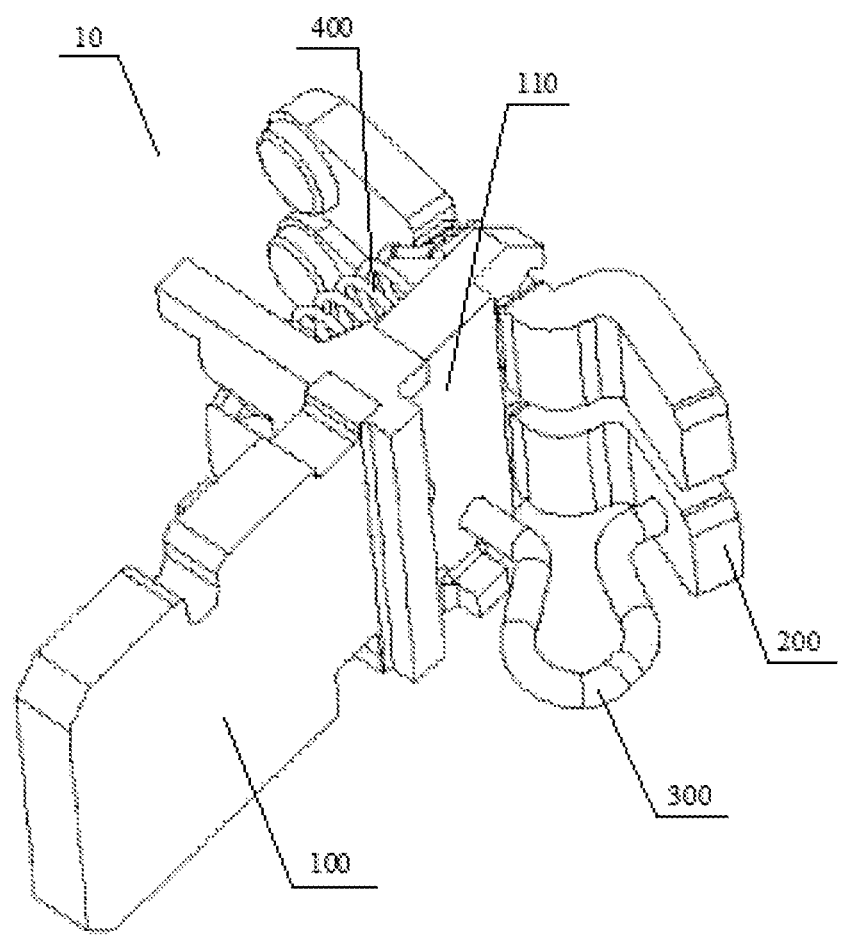
FIG. 1 is a structural schematic view of a switching device provided by Example 1 of the present disclosure.

REFERENCE SIGNS switching device 10; electricity leading member 100; second end 110; first contact portion 120; grip portion 130; grip space 140; grip wall surface 141; limiting groove 142; limiting bottom surface 143; limiting side surface 144; power transmission member 200; second contact portion 210; conductive connecting member 300; flexible conductive member 300a; connecting body 310; clamping body 320; inner side surface 321; clamping space 330; connecting portion 340; buffering telescopic member 400.

DETAILED DESCRIPTION OF EMBODIMENTS

The technical solutions in the embodiments of the present disclosure will be described clearly and completely below in conjunction with drawings in the embodiments of the present disclosure, obviously, the described embodiments are only a part of the embodiments of the present disclosure, rather than all of the embodiments. The components of embodiments of the present disclosure generally described and illustrated in the drawings herein may be arranged and designed in a variety of different configurations. Therefore, the following detailed description of the embodiments of the present disclosure provided in the accompanying drawings is not intended to limit the claimed scope of the present disclosure, but merely represents selected embodiments of the present disclosure. Based on the embodiments of the present disclosure, all other embodiments obtained by those skilled in the art, without making inventive effort, fall within the protection scope of the present disclosure.

In the present disclosure, orientation or positional relations indicated by terms such as "upper", "lower", "left", "right", "front", "rear", "top", "bottom", "inner", "outer", "middle", "vertical", "horizontal", "lateral", and "longitudinal" are based on orientation or positional relations as shown in the accompanying drawings. These terms are primarily used to better describe the present disclosure and embodiments thereof, and are not intended to limit related devices, elements, or components to be in the specific orientation, or constructed or operated in a specific orientation.

Furthermore, some of the above-mentioned terms may also be used to represent other meanings besides orientation or positional relationships, for example, the term "upper" may also be used to represent a certain attachment or connection relationship in some cases. For those ordinarily skilled in the art, the specific meanings of these terms in the present disclosure can be understood according to specific situations.

In addition, the terms "mount", "arrange", "provide", "connect" and "link" should be understood in a broad sense. For example, they can be fixed connection, detachable connection or monolithic construction; they can be mechanical connection or electrical connection; they can be directly attached or indirectly attached by intermediate medium, or connection can be the internal communication between two devices, elements or components. For those ordinarily skilled in the art, the specific meaning of the above terms in the present disclosure can be understood according to the specific situation.

Besides, terms "first", "second" and the like are mainly used to distinguish different devices, elements or components (the specific types and structures may be the same or different), and are not used to indicate or imply the relative importance or quantity of the related devices, elements or components. Unless stated otherwise, "plurality" means two or more.

In one embodiment, a switching device includes an electricity leading member, a power transmission member, and a conductive connecting member. The first end of the electricity leading member is configured to be electrically connected with the power supply terminal, and the second end of the electricity leading member is provided with a first contact portion; the power transmission member is provided with a second contact portion, and the second contact portion is configured to contact and be electrically connected with the first contact portion; one end of the conductive connecting member is connected with the electricity leading member, the other end is connected with the power transmission member, the electricity leading member is electrically connected with the power transmission member through the conductive connecting member.

Example 1

Figure 2:
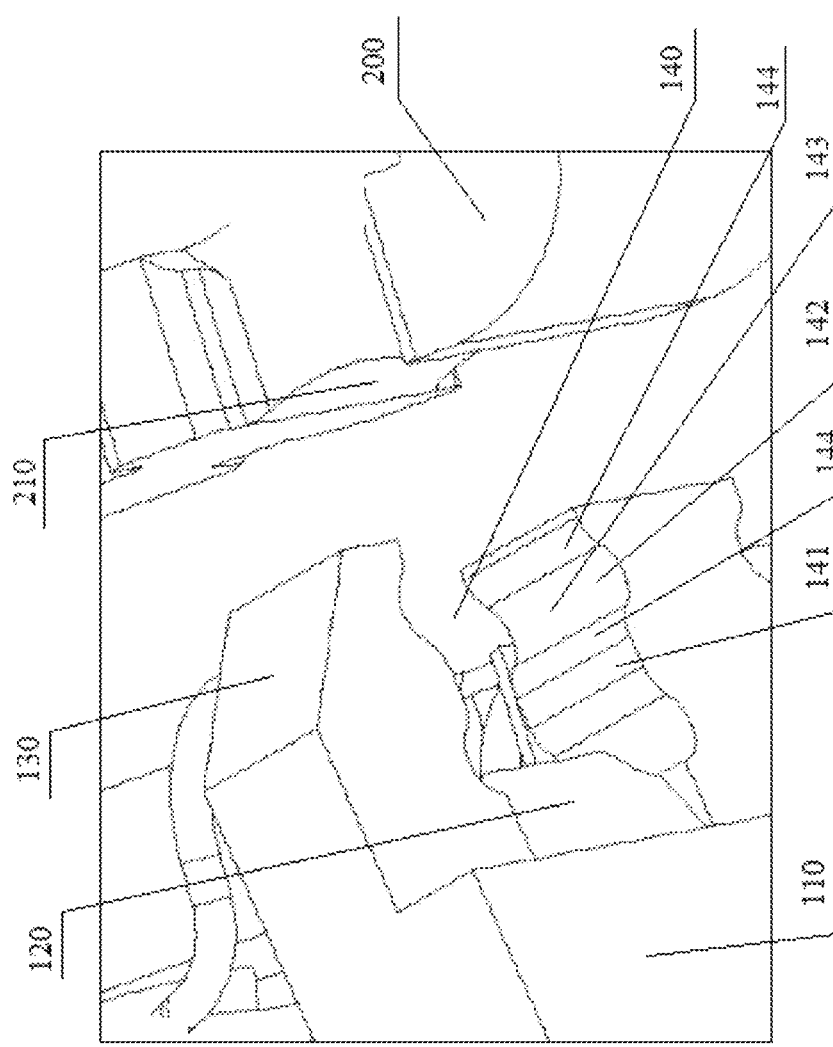
FIG. 2 is a partial structural schematic view of a switching device provided by Example 1 of the present disclosure.

As shown in FIG. 1 and FIG. 2, a switching device 10 according to an embodiment includes an electricity leading member 100, a power transmission member 200, and a conductive connecting member 300. The first end of the electricity leading member 100 is configured to be electrically connected with the power supply terminal, and the second end 110 of the electricity leading member 100 is provided with a first contact portion 120; the power transmission member 200 is provided with a second contact portion 210, and the second contact portion 210 is configured to be electrically connected with the first contact portion 120 in a contact manner; one end of the conductive connecting member 300 is connected with the electricity leading member 100, the other end is connected with the power transmission member 200, the electricity leading member 100 is electrically connected with the power transmission member 200 through the conductive connecting member 300. In the present embodiment, the electricity leading member 100, the power transmission member 200, the first contact portion 120 and the second contact portion 210 all have electrical conductivity.

In the above-mentioned switching device 10, the electricity leading member 100 is configured to be electrically connected with the power supply terminal through the first end, and the power transmission member 200 is configured to be electrically connected with an electric equipment; when the first contact portion 120 of the electricity leading member 100 is in contact with the second contact portion 210 of the power transmission member 200, the first contact portion 120 and the second contact portion 210 are electrically connected with each other, thus forming a channel for the current to pass through the power supply terminal, the electricity leading member 100, the first contact portion 120, the second contact portion 210, the power transmission member 200 and the electric equipment in sequence, so that the electric equipment can be powered. Simultaneously, the electricity leading member 100 is connected with the power transmission member 200 through the conductive connecting member 300, and the conductive connecting member 300 may conduct electricity, so the conductive connecting member 300 may electrically connect the electricity leading member 100 and the power transmission member 200, thereby forming another channel passing through the power supply terminal, the electricity leading member 100, conductive connecting member 300, the power transmission member 200 and the electric equipment in sequence; therefore, when the switching device 10 is vibrated so that the contact between the first contact portion 120 and the second contact portion 210 is disengaged, the channel formed by the power supply terminal, the electricity leading member 100, the first contact portion 120, the second contact portion 210, the power transmission member 200 and the electric equipment is disconnected between the first contact portion 120 and the second contact portion 210, at this moment, since the conductive connecting member 300 is still electrically connected with the electricity leading member 100 and the power transmission member 200, the channel formed by the power supply terminal, the electricity leading member 100, the conductive connecting member 300, the power transmission member 200 and the electric equipment is not disconnected, which can ensure that the current flows from the power supply terminal to the electric equipment normally, so as to avoid electric arc generated at the position where the first contact portion 120 and the second contact portion 210 are disconnected, protect electric appliances and circuits, and eliminate unsafe factors.

Example 2

Figure 3:
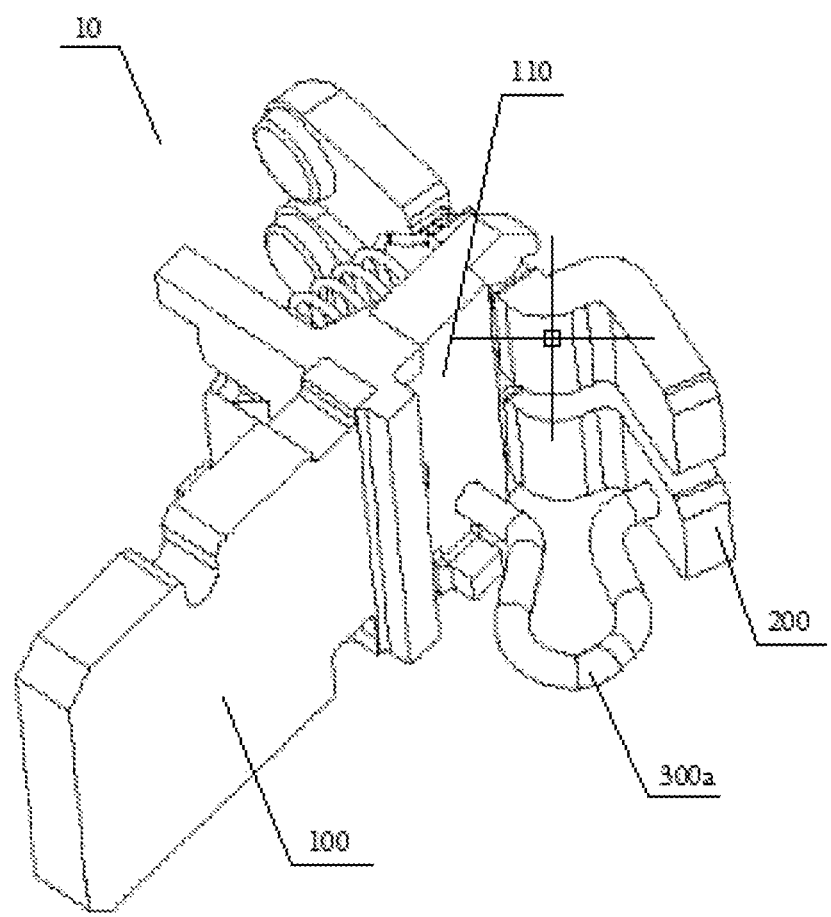
FIG. 3 is a structural schematic view of a switching device provided by Example 2 of the present disclosure.
Figure 4:
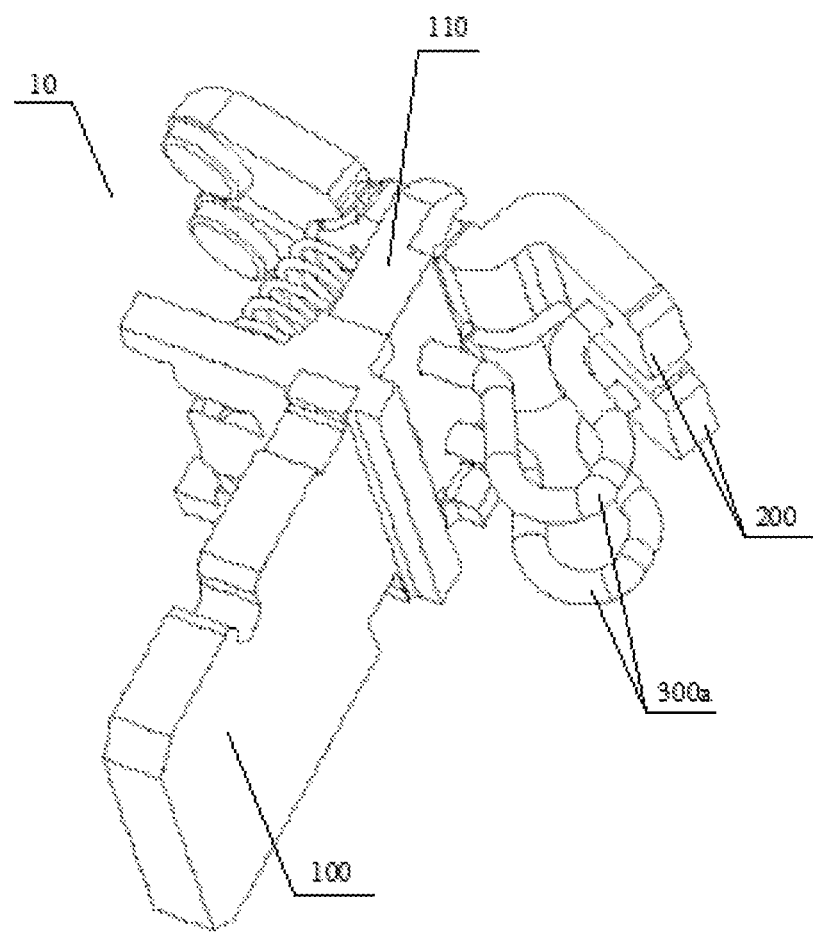
FIG. 4 is another structural schematic view of a switching device provided by Example 2 of the present disclosure.

On the basis of embodiment 1, in order to ensure that the conductive connecting member 300 is still connected to the electricity leading member 100 and the power transmission member 200 when the first contact portion 120 and the second contact portion 210 are out of contact, in one of the embodiments, as shown in FIG. 3, the conductive connecting member 300 is a flexible conductive member 300a with variable distance between its two ends, that is, the length of the flexible conductive member 300a may be extended or shortened, when the first contact portion 120 and the second contact portion 210 are out of contact, that is, the distance between the electricity leading member 100 and the power transmission member 200 increases, the flexible conductive member 300a may be stretched to keep the flexible conductive member 300a still connected to the electricity leading member 100 and the power transmission member 200; when the vibration is eliminated and the first contact portion 120 and the second contact portion 210 are in contact again, the flexible conductive member 300a may be shortened or still remain elongated, as long as it is still connected to the electricity leading member 100 and the power transmission member 200. In this embodiment, the flexible conductive member 300a may be a flexible and bendable material, or may be an elastic material. Exemplarily, the flexible conductive member 300a is a wire. Exemplarily, the flexible conductive member 300a is a copper braided wire, which has good flexibility, resistance to bending, and strong electric conductivity and is convenient to install. Exemplarily, the flexible conductive member 300a is an elastic conductive member that can be expanded and contracted along its own length direction. Exemplarily, the flexible conductive member 300a is a tension spring made of conductive metal material. In one of embodiments, as shown in FIG. 3, the number of the flexible conductive member 300a is one, so that there is no need for multiple flexible conductive members 300a to electrically connect the electricity leading member 100 and the power transmission member 200, and just one flexible conductive member 300a can realize the channel from the power supply terminal to the electric equipment, even if all the first contact portions 120 are separated from the second contact portions 210, just one flexible conductive member 300a is needed to ensure the channel, which saves materials and costs. In one of the embodiments, as shown in FIG. 4, a plurality of flexible conductive members 300a are provided, so as to ensure that when the electrical connection of some the flexible conductive members 300a to the electricity leading member 100 and the power transmission member 200 fails, there are still some conductive connecting members 300 that can be electrically connected to the electricity leading member 100 and the power transmission member 200, thereby ensuring the channel from the power supply terminal to the electric equipment.

In one of the embodiments, as shown in FIG. 3, one end of the flexible conductive member 300a is connected to the first position point of the electricity leading member 100, and the other end of the flexible conductive member 300a is connected to the second position point of the power transmission member 200, the distance between the first position point and the second position point is smaller than the length of the flexible conductive member 300a. In this embodiment, the flexible conductive member 300a may be a flexible and bendable material, or may be an elastic material. Exemplarily, the flexible conductive member 300a is a wire. Exemplarily, the flexible conductive member 300a is an elastic conductive member that can be expanded and contracted along its own length direction. In this way, when the flexible conductive member 300a is a soft wire, when the first contact portion 120 and the second contact portion 210 are in contact, the flexible conductive member 300a is bent, and when the first contact portion 120 and the second contact portion 210 are out of contact, that is, the distance between the electricity leading member 100 and the power transmission member 200 is increased, the bending of the flexible conductive member 300a as a wire is reduced, and the flexible conductive member 300a is slightly stretched, since the flexible conductive member 300a is bent when the first contact portion 120 and the second contact portion 210 are in contact, when the first contact portion 120 and the second contact portion 210 are out of contact, the flexible conductive member 300a can still connect the electricity leading member 100 and the power transmission member 200; when the flexible conductive member 300a is an elastic conductive member that can be stretched along its own length direction, and when the first contact portion 120 and the second contact portion 210 are in contact, the flexible conductive member 300a may be in a compressed state, a natural-length state or a stretched state, when the first contact portion 120 and the second contact portion 210 are out of contact, that is, the distance between the electricity leading member 100 and the power transmission member 200 increases, the flexible conductive member 300a will be stretched, and may still be connected to the electricity leading member 100 and the power transmission member 200; it should be noted that, the length of the flexible conductive member 300a as the elastic conductive member is still greater than the distance between the first contact point and the second contact point.

In one of the embodiments, as shown in FIG. 3, the first position point is located at the second end 110 of the electricity leading member 100, and located on the side of the first contact portion 120, and the second position point is located on the side of the second contact portion 210. In this embodiment, the flexible conductive member 300a may be a wire, in this way, the distance between the first position point and the second position point is smaller, so that the required length of the flexible conductive member 300a is also smaller, which can save a certain amount of material of the flexible conductive member 300a, and avoid entanglement or interference of the overlong flexible conductive member 300a with other equipment.

In one of embodiments, two ends of the flexible conductive member 300a are fixedly connected to the electricity leading member 100 and the power transmission member 200, respectively, which ensures that the flexible conductive member 300a is firmly connected to the electricity leading member 100 and the power transmission member 200, so as to ensure that the channel formed by the power supply terminal, the electricity leading member 100, the conductive connecting member 300, the power transmission member 200 and the electrical equipment is not disconnected due to the influence of vibration. In one of embodiments, two ends of the flexible conductive member 300a are welded to the electricity leading member 100 and the power transmission member 200, respectively. In one of embodiments, two ends of the flexible conductive member 300a are respectively bonded to the electricity leading member 100 and the power transmission member 200. In one of embodiments, two ends of the flexible conductive member 300a are respectively in wrapped connection to the electricity leading member 100 and the power transmission member 200. In other embodiments, two ends of the flexible conductive member 300a can also be connected to the electricity leading member 100 and the power transmission member 200 in other ways, respectively, so as to keep the flexible conductive member 300a firmly connected to the electricity leading member 100 and the power transmission member 200.

Example 3

Figure 5:
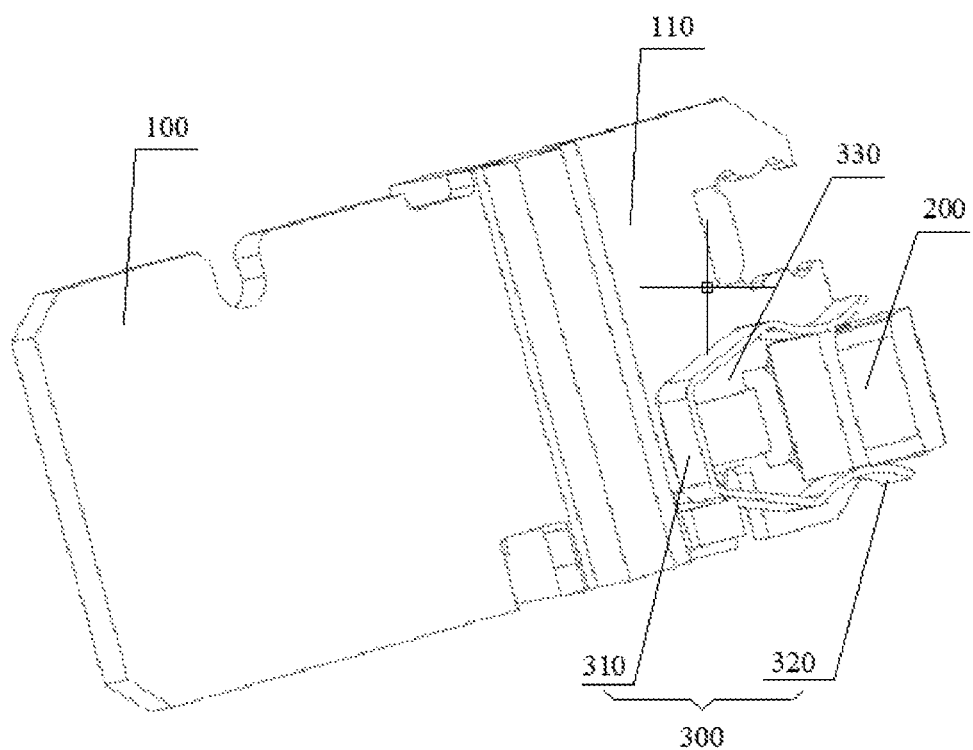
FIG. 5 is a structural schematic view of a switching device provided by Example 3 of the present disclosure.
Figure 6:
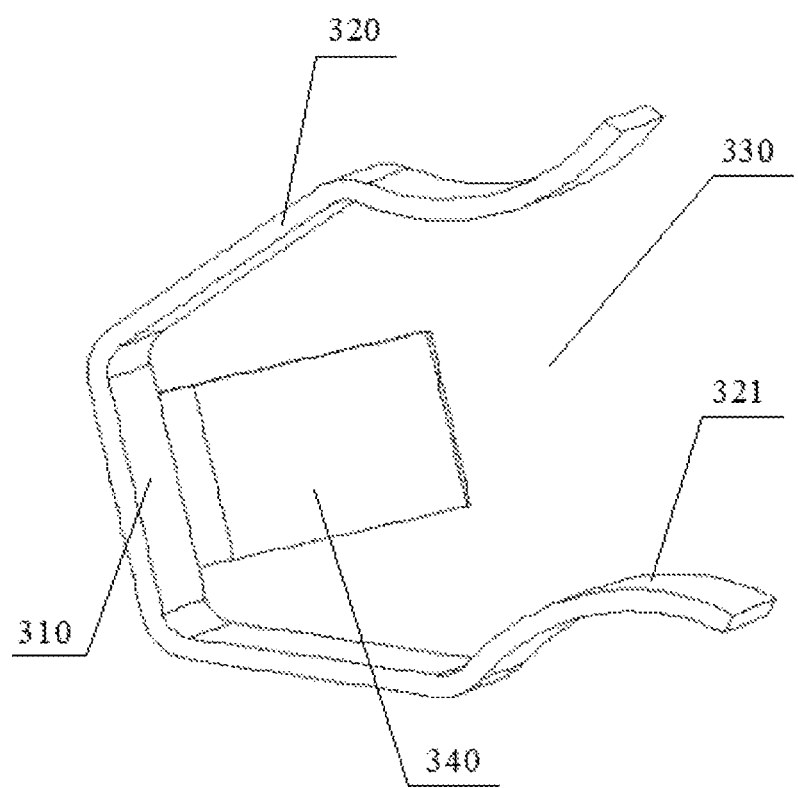
FIG. 6 is a structural schematic view of a conductive connecting member provided by Example 3 of the present disclosure.

On the basis of embodiment 1, in order to ensure that when the first contact portion 120 and the second contact portion 210 are out of contact, the conductive connecting member 300 is still connected to the electricity leading member 100 and the power transmission member 200, in one of the embodiments, as shown in FIG. 5 and FIG. 6, the conductive connecting member 300 comprises a connecting body 310 and a plurality of clamping bodies 320, wherein the connecting body 310 is connected to the electricity leading member 100, so as to be electrically connected with the electricity leading member 100, and one end of each of the clamping bodies 320 is connected with the connecting body 310, and the plurality of clamping bodies 320 form a clamping space 330, the clamping space 330 is configured to clamp the power transmission member 200. In this embodiment, through the abutment between each of clamping bodies 320 and the power transmission member 200, the power transmission member 200 is electrically connected with the clamping bodies 320 and the connecting body 310, and further electrically connected with the electricity leading member 100, and the power transmission member 200 is clamped in the clamping space 330. Since the power transmission member 200 is abutted by each of clamping bodies 320 and located in the clamping space 330, when the first contact portion 120 and the second contact portion 210 are out of contact due to vibration, there is relative sliding between the power transmission member 200 and each of clamping bodies 320, however, since the clamping space 330 formed by clamping bodies 320 has a certain depth, the power transmission member 200 still abuts each of clamping bodies 320, so that the clamping bodies 320 are still electrically connected with the power transmission member 200, that is, the conductive connecting member 300 is still electrically connected with the power transmission member 200, so as to ensure that the channel formed by the power supply terminal, the electricity leading member 100, the conductive connecting member 300, the power transmission member 200 and the electric equipment is not disconnected due to the influence of vibration. In one of embodiments, each of the clamping bodies 320 and the connecting body 310 are integrally formed. In one of embodiments, the conductive connecting member 300 is made of a high elastic metal.

In one of the embodiments, the connecting body 310 is provided on the second end 110 of the electricity leading member 100, so that the clamping bodies 320 clamp the power transmission member 200 nearby, the connecting body 310 and the clamping bodies 320, which are in smaller size, can electrically connect the electricity leading member 100 and the power transmission member 200. In one of embodiments, the connecting body 310 is provided on the end surface of the second end 110 of the electricity leading member 100, so that the connecting body 310 is closer to the power transmission member 200, which can further reduce the size and save the cost.

In one of embodiments, the connection between the connecting body 310 and the electricity leading member 100 may be stamping, welding, integral molding, snap-fit, plugging, screw connection or the like. Exemplarily, the connecting body 310 is connected with the electricity leading member 100 by butt welding, so that welding can be performed directly without solder, so as to avoid unnecessary objects occupying space or interfering with other components, which can ensure that the overall structure of the switching device 10 is compact, and the deformation of the welded components is smaller. Exemplarily, the connecting body 310 is connected to the electricity leading member 100 by tin soldering. Exemplarily, the connecting body 310 is connected to the electricity leading member 100 by spot welding, wherein the welding is fast, so that the connecting body 310 and the electricity leading member 100 are quickly connected without welding material.

In one of embodiments, the clamping bodies 320 have elasticity, so that the clamping bodies 320 elastically abut on the power transmission member 200, which not only ensures that each of clamping bodies 320 stably clamps the power transmission member 200, but also when the first contact portion 120 and the second contact portion 210 are out of contact by vibration, the clamping bodies 320 still elastically abut on the power transmission member 200 due to the elastic effect, the electrical connection between the conductive connecting member 300 and the power transmission member 200 is ensured.

In one of the embodiments, as shown in FIG. 6, the clamping body 320 is an elastic member; the clamping body 320 has an inner side surface 321 for abutting the power transmission member 200, the inner side surface 321 of each of the clamping bodies 320 is bent inward, so that the inner side surface 321 forms a convex curved surface; the opening formed by ends of the clamping bodies 320 adjacent to the connecting body 310 is larger than the opening formed by the middle points of the clamping bodies 320, the opening formed by ends of the clamping bodies 320 away from the connecting body 310 is larger than the opening formed by the middle points of the two clamping bodies 320, in this way, the entire clamping space 330 is wide at both ends and narrow in the middle, so that the power transmission member 200 can enter the clamping space 330 along the wider opening, and can slide along the convex curved surface to reach the highest point of the convex curved surface, which can ensure that the elastic clamping bodies 320 press the power transmission member 200 tightly; moreover, since the width of the deep part of the clamping space 330 is also larger than the width in the middle, when part or all of the power transmission member 200 is located in the deep part of the clamping space 330, when the first contact portion 120 and the second contact portion 210 are disengaged due to vibration, the power transmission member 200 may have the action of squeezing the clamping bodies 320, under the extrusion of the highest point of the convex curved surface, the power transmission member 200 can be prevented from being separated from the clamping space 330, thereby ensuring that the conductive connecting member 300 is electrically connected with the power transmission member 200. Exemplarily, the clamping body 320 is an elastic member made of conductive material. In one of embodiments, the clamping body 320 is made of high elastic metal, such as a metal elastic sheet. In one of embodiments, the convex curved surface is a convex cambered surface, which is more convenient for the power transmission member 200 to be in sliding abutment with the clamping bodies 320.

In one of the embodiments, as shown in FIG. 5, a portion between two ends of the connecting body 310 is connected to the electricity leading member 100, and the conductive connecting member 300 comprises two clamping bodies 320 provided opposite to each other, one of the clamping bodies 320 is provided at one end of the connecting body 310, and the other clamping body 320 is provided at the other end of the connecting body 310, and the two clamping bodies 320 are configured to clamp the power transmission member 200, in this way, by providing the clamping bodies 320 at the end of the connecting body 310, the overall size of the conductive connecting member is reduced on the basis of ensuring that the power transmission member 200 can be clamped, which not only saves materials, but also makes the structure compact, and prevents the conductive connecting member 300 from interfering with other components; moreover, the two opposite surfaces of the power transmission member 200 can be clamped by the two clamping bodies 320, to clamp the power transmission member 200 tightly, so that the structure of the conductive connecting member 300 is simple, the manufacturing is easy, and the material is further saved. In one of embodiments, the clamping bodies 320 is perpendicular to the connecting body 310.

Figure 7:
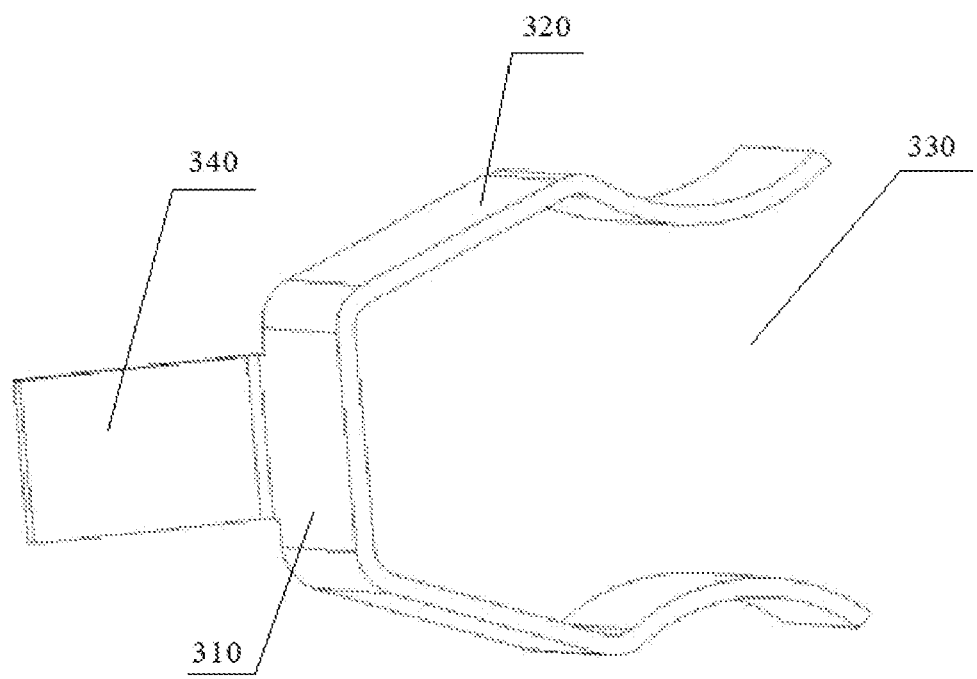
FIG. 7 is another structural schematic view of a conductive connecting member provided by Example 3 of the present disclosure.

In one of embodiments, as shown in FIG. 5 to FIG. 7, the conductive connecting member 300 further includes a connecting portion 340, and the electricity leading member 100 and the connecting body 310 are respectively connected to the connecting portion 340, that is, the connecting body 310 is connected to the electricity leading member 100 through the connecting portion 340, and the connecting portion is provided to facilitate the connection between the connecting body 310 and the electricity leading member 100, for example, during welding, when the connecting body 310 is sheet-shaped with the side facing the electricity leading member 100, the area of the side is too small, which is inconvenient for welding, by adding the connecting portion 340 as a welding portion to be welded with the electricity leading member 100, the conductive connecting member 300 is fixed on the electricity leading member 100. In one of embodiments, as shown in FIG. 6, the connecting portion 340 extends towards inside of the clamping space 330, such that the connecting portion 340 can extend inward and can be welded with the electricity leading member 100 at the same time, when the installation space of the conductive connecting member 300 is insufficient. In one of embodiments, as shown in FIG. 7, the connecting portion 340 extends towards outside of the clamping space 330, at this time, when the installation space of the conductive connecting member 300 is sufficient, the connecting portion 340 can extend outward to be welded with the electricity leading member 100, which is more convenient for welding.

Figure 8:
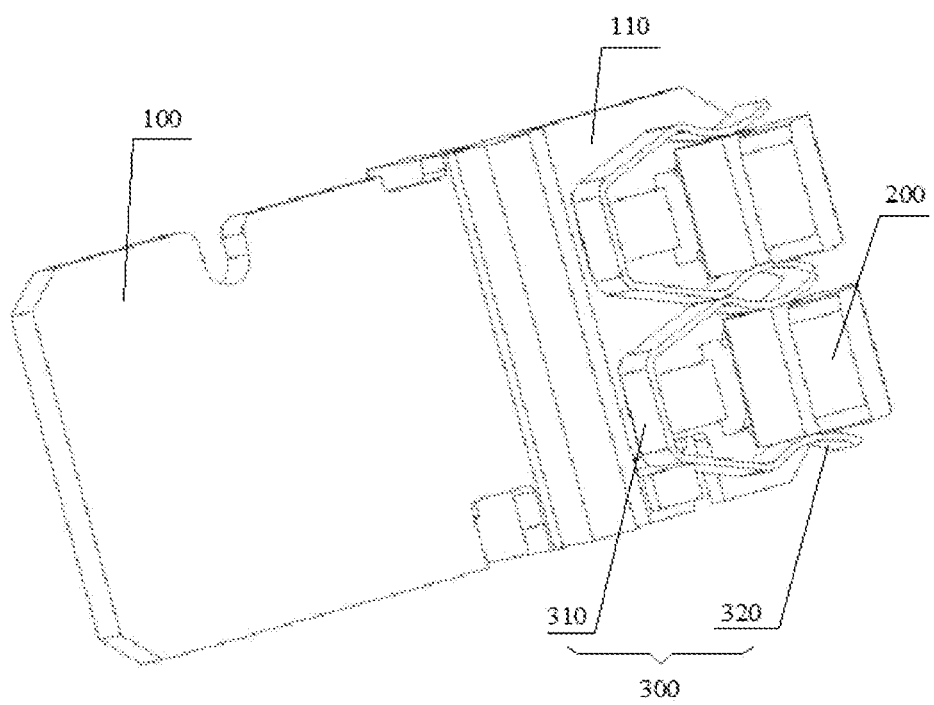
FIG. 8 is another structural schematic view of a switching device provided by Example 3 of the present disclosure.

In one of the embodiments, as shown in FIG. 5 and FIG. 8, a plurality of power transmission members 200 are provided, a plurality of first contact portions 120 are correspondingly provided, the plurality of first contact portions 120 are electrically connected with the plurality of second contact portions 210 in a manner of contacting in one-to-one correspondence; each of the at least one power transmission member 200 is connected to the electricity leading member 100 through one conductive connecting member 300, in this way, the plurality of second contact portions 210 of the plurality of power transmission members 200 are electrically connected with the plurality of first contact portions 120 of the electricity leading member 100 in a manner of contacting in one-to-one correspondence, when there is vibration, it is possible that some of the first contact portions 120 and the second contact portions 210 are not out of contact, which improves the possibility that the electricity leading member 100 and the power transmission member 200 are still electrically connected, thus improving the possibility of avoiding electric arcs caused by an open circuit; in this way, even when the conductive connecting member 300 fails, that is, when the conductive connecting member 300 fails to electrically connect the electricity leading member 100 and the power transmission member 200, when there are still the first contact portion 120 and the second contact portion 210 in contact with each other, the channel from the power supply terminal to the electric equipment can still be ensured.

In one of the embodiments, as shown in FIG. 5, one of the power transmission members 200 is connected to the electricity leading member 100 through one conductive connecting member 300, in this way, there is no need for multiple conductive connecting members 300 to electrically connect the electricity leading member 100 and the power transmission member 200, and just one conductive connecting member 300 is needed to realize the channel from the power supply terminal to the electric equipment, even if all the first contact portions 120 are disengaged from the second contact portions 210, just one conductive connecting member 300 is needed to ensure the channel, which saves materials and costs.

In other embodiments, as shown in FIG. 8, a plurality of conductive connecting members 300 are provided, the plurality of conductive connecting members 300 are connected to the plurality of power transmission members 200 in one-to-one correspondence, and the plurality of conductive connecting members 300 are respectively connected to the electricity leading member 100, which provides multiple security, when all the first contact portions 120 are disengaged from the second contact portions 210, and one or several conductive connecting members 300 fail, there may still be at least one conductive connecting member 300 electrically connecting the electricity leading member 100 and the power transmission member 200, which can ensure that when the electrical connection of some of the flexible conductive members 300a to the electricity leading member 100 and the power transmission member 200 fails, there are still some conductive connecting members 300 that can be electrically connected to the electricity leading member 100 and the power transmission member 200, thereby ensuring the channel from the power supply terminal to the electric equipment.

In one of the embodiments, as shown in FIG. 2, the end surface of the second end 110 of the electricity leading member 100 is provided with a plurality of grip portions 130, and the plurality of grip portions 130 form a grip space 140 for clamping the power transmission member 200, the first contact portion 120 is provided on the end surface of the second end 110 of the electricity leading member 100 and located in the grip space 140; the second contact portion 210 is provided on a surface of the power transmission member 200 facing the second end 110 of the electricity leading member 100; when the first contact portion 120 is in contact with the second contact portion 210, each of the grip portions 130 clamps the power transmission member 200. In this embodiment, the grip portion 130 has conductivity, in this way, the power transmission member 200 is gripped by each of the grip portions 130, so that the power transmission member 200 can be stably confined in the grip space 140, and the second contact portion 210 stably abuts the first contact portion 120, due to the restriction of each of the grip portions 130 on the power transmission member 200, the second contact portion 210 can be prevented from being separated from the first contact portion 120 to a certain extent when subjected to vibration, and even when the first contact portion 120 is separated from the second contact portion 210, the electrical connection between the power transmission member 200 and the grip portion 130 can still ensure the formation of a channel of the power supply terminal, the electricity leading member 100, the grip portion 130, the power transmission member 200 and the electric equipment; in this way, when the conductive connecting member 300 fails, the channel can still be ensured to be formed. In one of embodiments, the grip portion 130 is integrally formed with the second end 110 of the electricity leading member 100, i.e., integrally formed with the electricity leading member 100, so that the structure of the grip portion 130 is stable.

In one of the embodiments, as shown in FIG. 2, the grip space 140 comprises two grip wall surfaces 141, each of the grip wall surfaces 141 is provided with a plurality of mutually spaced limiting grooves 142, the plurality of the limiting grooves 142 on one grip wall surface 141 are one-to-one opposite to the plurality of the limiting grooves 142 on the other grip wall surface 141, and the two opposite limiting grooves 142 are configured to clamp and limit the power transmission member 200, in this embodiment, the limiting grooves 142 are configured to accommodate and limit two opposite sides of the power transmission member 200, in this way, a plurality of spaced limiting grooves 142 are formed, the limiting grooves 142 can better limit the power transmission member 200 and avoid the separation of the first contact portion 120 and the second contact portion 210 when subjected to vibration, and when the first contact portion 120 and the second contact portion 210 are separated due to vibration, that is, at the same time, when the power transmission member 200 is away from the second end 110 of the electricity leading member 100, the power transmission member 200 slides from the first limiting groove 142 to the second limiting groove 142, so that the power transmission member 200 is still gripped and limited.

In one of the embodiments, the limiting groove 142 has a limiting bottom surface 143 and two limiting side surfaces 144 respectively connected to both ends of the limiting bottom surface 143, one end of the limiting side surface 144 away from the limiting bottom surface 143 is connected to the grip wall surface 141, and one end of the limiting side surface 144 away from the limiting bottom surface 143 is inclined toward the grip wall surface 141, in this way, it is convenient to make the power transmission member 200 enter the grip space 140 and the limiting groove 142, which can not only limit the power transmission member 200 to a certain extent during vibration, but also facilitate the power transmission member 200 entering the grip space 140 and the limiting groove 142 during assembly, and a smaller size of the grip space 140 can be set, so that the power transmission member 200 can be more stably limited during position limiting.

In one of embodiments, one end of the limiting side surface 144 is transitioned to the limiting bottom surface via an arc, and the other end is transitioned to the grip wall surface 141 via an arc, so that the limiting side surface 144 is respectively transitioned to the limiting bottom surface and the grip wall surface 141 via an arc, therefore, the power transmission member 200 can be more easily installed in the grip space 140, and the grip space 140 with a smaller size can be provided, so that the power transmission member 200 can be more stably limited during limiting. In one of embodiments, the entire inner wall surface of the limiting groove 142 forms a concave arc surface.

In one of the embodiments, as shown in FIG. 1, the switching device 10 further comprises a buffering telescopic member 400, one end of the buffering telescopic member 400 is connected to the electricity leading member 100, and the other end is connected to the power transmission member 200, and the buffering telescopic member 400 provides an acting force for keeping the first contact portion 120 and the second contact portion 210 in abutment, that is, the buffering telescopic member 400 provides the force for the contact between the first contact portion 120 of the electricity leading member 100 and the second contact portion 210 of the power transmission member 200, the first contact portion 120 and the second contact portion 210 are kept in abutment by providing the buffering telescopic member 400, the first contact portion 120 and the second contact portion 210 are prevented to a certain extent from being separated when the switching device 10 is vibrated, which, in cooperation with the conductive connecting member 300, plays the role of double security; when the vibration is smaller, the first contact portion 120 can still be in contact with the second contact portion 210 under the action of the buffering telescopic member 400; when the vibration is larger so that the first contact portion 120 and the second contact portion 210 are disengaged against the acting force of the buffering telescopic member 400, there is still the conductive connecting member 300 playing the role of electrically connecting the electricity leading member 100 and the power transmission member 200; similarly, when the electrical connection of the conductive connecting member 300 to the electricity leading member 100 and the power transmission member 200 fails, and the vibration is smaller, the buffering telescopic member 400 can keep the first contact portion 120 and the second contact portion 210 in contact.

In one of the embodiments, the buffering telescopic member 400 is provided between a first acting surface of the electricity leading member 100 and a second acting surface of the power transmission member 200; the buffering telescopic member 400 is a tensile elastic member; the first acting surface faces the power transmission member 200, the second acting surface faces the electricity leading member 100, and one end of the buffering telescopic member 400 is connected with the first acting surface in a stretched manner, and the other end is connected with the second acting surface in a stretched manner, that is, one end of the buffering telescopic member 400 is connected by stretching with the first acting surface, and the other end is connected by stretching with the second acting surface, and the first acting surface and the second acting surface are respectively pulled by the tensile elastic member, so as to pull the electricity leading member 100 and the power transmission member 200, so that the first contact portion 120 and the second contact portion 210 are abutted with each other, so as to realize the contact-type electrical connection; compared with the compressive elastic member, the tensile elastic member can maintain a straight shape without bending or shifting when being stretched, and can pull and connect the electricity leading member 100 and the power transmission member 200 stably. In one of the embodiments, the tensile elastic member is a tensile spring.

In one of embodiments, the buffering telescopic member 400 is a tensile elastic member, one end of the tensile elastic member is hooked to the electricity leading member 100 through one hook portion, and the other end of the tensile elastic member is hooked to the power transmission member 200 through one hook portion, which ensures that the tensile elastic member acts on the electricity leading member 100 and the power transmission member 200 and facilitates disassembly.

In one of the embodiments, the buffering telescopic member 400 is provided between the first acting surface of the electricity leading member 100 and the second acting surface of the power transmission element 200; the buffering telescopic member 400 is a compressive elastic member; the first acting surface is facing away from the power transmission member 200, the second acting surface is facing away from the electricity leading member 100, and one end of the buffering telescopic member 400 is connected with the first acting surface in a compressed manner, and the other end is connected with the second acting surface in a compressed manner, that is, one end of the buffering telescopic member 400 is in compressing connection with the first acting surface, and the other end is in compressing connection with the second acting surface, for example, it can be abutment and extrusion, or it can be fixed connection and extrusion, the compressive elastic member compresses the first acting surface and the second acting surface, respectively, since the first acting surface is facing away from the power transmission member 200, and the second acting surface is facing away from the electricity leading member 100, therefore, it is possible to squeeze the electricity leading member 100 towards the power transmission member 200 and simultaneously squeeze the power transmission member 200 towards the electricity leading member 100, so that the first contact portion 120 and the second contact portion 210 are abutted with each other, thereby realizing contact-type electrical connection. In one of the embodiments, the compression elastic member is a compression spring. In one of embodiments, a guidepost is provided inside the compression spring, the length direction of the guidepost is parallel to the expansion and contraction direction of the compression spring, and the guidepost is connected to one of the first acting surface and the second acting surface, which can laterally limit the compression spring, thereby preventing twisting when the compression spring is compressed.

In one of the embodiments, the first contact portion 120 has a first contact surface, the second contact portion 210 has a second contact surface, the first contact surface is configured to abut the second contact surface, so that the first contact portion 120 is electrically connected with the second contact portion 210; the first contact surface and the second contact surface are respectively smooth surfaces, when the switching device 10 is vibrated, the first contact portion 120 and the second contact portion 210 may occur wear during the continuous contact and disengagement process, the first contact surface of the first contact portion 120 and the second contact surface of the second contact portion 210 are provided as smooth surfaces, respectively, thereby avoiding or reducing the occurred wear when the first contact portion 120 and the second contact portion 210 touch back and forth.

In one of the embodiments, the first contact surface and the second contact surface are respectively provided with a smooth conductive coating or a conductive film, which can avoid or reduce the occurred wear of the first contact portion 120 and the second contact portion 210 during the continuous contact and disengagement process. Exemplarily, the conductive coating may be a graphite conductive powder layer.

In all the embodiments of the present disclosure, "large" and "small" are relative terms, "more" and "less" are relative terms, and "up" and "lower" are relative terms, expressions of such relative terms are not repeated in the embodiments of the present disclosure.

It should be understood that references throughout the specification to "in this embodiment", "in an embodiment of the present disclosure" or "in one of the embodiments" mean that a specific feature, structure or characteristic related to the embodiment is included in at least one embodiment of the present disclosure. Therefore, appearances of "in this embodiment," "in an embodiment of the present disclosure," or "in one of the embodiments" in various places throughout the specification do not necessarily refer to the same embodiment. Furthermore, the specific feature, structure or characteristic may be combined in any suitable manner in one or more embodiments. Those skilled in the art should also know that the embodiments described in the specification are all optional embodiments, and the actions and modules involved are not necessarily required by the present disclosure.

In the various embodiments of the present disclosure, it should be understood that the size of the sequence numbers of the above-mentioned processes does not imply an inevitable sequence of execution, and the execution sequence of each process should be determined by functions and internal logic thereof, and should not constitute any limitation on the implementation process of the embodiments of the present disclosure.

The above are only specific embodiments of the present disclosure, but the protection scope of the present disclosure is not limited to this, any skilled person in the art, within the technical scope disclosed in the present disclosure, can easily conceive changes or substitutions, which should all be covered within the protection scope of the present disclosure. Therefore, the protection scope of the present disclosure should be subject to the protection scope of the claims.

What is claimed is:

1. A switching device, comprising:
    an electricity leading member, wherein a first end of the electricity leading member is configured to be electrically connected with a power supply terminal, and a second end of the electricity leading member is provided with a first contact portion;
    a power transmission member, provided with a second contact portion, wherein the second contact portion is configured to be electrically connected with the first contact portion in a contact manner; and
    a conductive connecting member, wherein the conductive connecting member has one end connected with the electricity leading member, and another end connected with the power transmission member, and the electricity leading member is electrically connected with the power transmission member through the conductive connecting member,
    wherein the conductive connecting member is made of an elastic metal, and comprises a connecting body and a plurality of clamping bodies, wherein the connecting body is connected to the electricity leading member, and one end of each of the clamping bodies is connected with the connecting body, and the plurality of clamping bodies form a clamping space for clamping the power transmission member,
    each of the clamping bodies is an elastic member; each of the clamping bodies has an inner side surface for abutting the power transmission member, and the inner side surface of each of the clamping bodies is bent inward, so that the inner side surface forms a convex curved surface; an opening formed by ends of the clamping bodies adjacent to the connecting body is larger than an opening formed by middle points of the clamping bodies, and an opening formed by ends of the clamping bodies away from the connecting body is larger than an opening formed by middle points of two clamping bodies.

2. The switching device according to claim 1, wherein a portion between two ends of the connecting body is connected to the electricity leading member, and the conductive connecting member comprises two clamping bodies provided opposite to each other, one of the clamping bodies is provided at one end of the connecting body, and another clamping body is provided at another end of the connecting body, and the two clamping bodies are configured to clamp the power transmission member.

3. The switching device according to claim 1, wherein an end surface of the second end of the electricity leading member is provided with a plurality of grip portions, and the plurality of grip portions form a grip space for clamping the power transmission member, the first contact portion is provided on the end surface of the second end of the electricity leading member and located in the grip space; the second contact portion is provided on a surface of the power transmission member facing the second end of the electricity leading member; and when the first contact portion is in contact with the second contact portion, each of the grip portions clamps the power transmission member.

4. The switching device according to claim 3, wherein the grip space comprises two grip wall surfaces, each of the grip wall surfaces is provided with a plurality of mutually spaced limiting grooves, the plurality of limiting grooves on one of the grip wall surfaces are one-to-one opposite to the plurality of limiting grooves on another grip wall surface, and two opposite limiting grooves are configured to clamp and limit the power transmission member.

5. The switching device according to claim 4, wherein each of the limiting grooves has a limiting bottom surface and two limiting side surfaces respectively connected to both ends of the limiting bottom surface, one end of each of the limiting side surfaces away from the limiting bottom surface is connected to a corresponding grip wall surface, and one end of each of the limiting side surfaces away from the limiting bottom surface is inclined toward the grip wall surface.

6. The switching device according to claim 1, wherein the first contact portion has a first contact surface, the second contact portion has a second contact surface, the first contact surface is configured to abut the second contact surface, so that the first contact portion is electrically connected with the second contact portion; and the first contact surface and the second contact surface are respectively smooth surfaces.

7. The switching device according to claim 6, wherein the first contact surface and the second contact surface are respectively provided with a smooth conductive coating or a conductive film.

* * * * *